United States Patent [19]

Koike et al.

[11] 4,037,015
[45] July 19, 1977

[54] HEAT INSULATING COATING MATERIAL

[75] Inventors: Keiichi Koike, Matsudo; Toshimi Sasaki, Abiko, both of Japan

[73] Assignee: Hitachi, Ltd., Japan

[21] Appl. No.: 560,818

[22] Filed: Mar. 21, 1975

[30] Foreign Application Priority Data

Mar. 29, 1974 Japan ................................ 49-34427
Mar. 29, 1974 Japan ................................ 49-34428

[51] Int. Cl.$^2$ .............................................. B28B 7/36
[52] U.S. Cl. ............................... 428/331; 106/38.27; 106/38.3; 106/122
[58] Field of Search ................. 106/40, 122, 75, 74, 106/69; 252/62; 428/450, 331

[56] References Cited

U.S. PATENT DOCUMENTS

| | | | |
|---|---|---|---|
| 3,353,975 | 11/1967 | Shannon | 106/40 R X |
| 3,450,547 | 6/1969 | Sams | 106/40 X |
| 3,756,839 | 9/1973 | Rao | 106/75 |
| 3,804,643 | 4/1974 | Arita et al. | 106/38.9 |
| 3,870,595 | 3/1975 | Hawthorne | 428/450 |
| 3,935,060 | 1/1976 | Blome et al. | 106/69 |
| 3,959,063 | 3/1976 | Hawthorne | 428/450 |

*Primary Examiner*—Theodore Morris
*Attorney, Agent, or Firm*—Craig & Antonelli

[57] ABSTRACT

A heat insulating coating material is provided by admixing an alkali metal silicate binder and water with aggregates comprising silica-containing inorganic refractory fibers, silica-containing porous refractory materials and silica-containing powdery refractory materials. The alkali metal silicate binder can be replaced by a phosphate binder, depending upon the nature of an atmosphere, and finely divided metals can be incorporated into the aggregates.

16 Claims, No Drawings

HEAT INSULATING COATING MATERIAL

BACKGROUND OF THE INVENTION

This invention relates to a heat insulating coating material for use in protecting machinery from high temperatures in a reducing or oxidizing atmosphere, in lining the interior of a heating furnace, and in preventing a substance such as steel from being partially heated or retarding the cooling rate of a substance in the heat treatment.

Hitherto, a heat insulating material, which can be used in a reducing or oxidizing atmosphere, has been applied by mechanically fixing asbestos fibers, glass fibers or fabrics thereof or adhering them together with a binder, or applying the mixture of asbestos or light-weight refractory particles with clay, refractory cement or inorganic binders to substrates.

Such prior applying processes do not only require skill and a long period of time when the heat insulating material is to be applied to substrates of, for example, steel, but also they have such drawbacks that said material is peeled from said substrates when heated, cooled or subjected to mechanical impact, because of weak adhesiveness of said material to metallic surfaces of said substrates.

The causes of the peeling are believed that the adhesion between heat insulating materials and metallic surfaces is not strong, the strength of heat insulating materials is low due to weak bonding force of said materials per se, oxides on metallic surfaces are reduced when an atmosphere is reducing, or oxides are formed on metallic surfaces when an atmosphere is oxidizing.

It is considered that a binder having a low melting point is used and vitrified to prevent the peeling, but in such case the molten binder is penetrated into aggregates or reacted with aggregates, so that the heat insulating material is totally made vitreous, and thus a porosity is lowered and the insulating effect is lowered. Where an atmosphere is oxidizing, resultant oxides are diffused into a binder, the bond strength of the binder is lowered and resultant coatings are weak.

OBJECTS OF THE INVENTION

The object of this invention is to provide a heat insulating material which can not only be readily applied or adhered to surfaces of a metal such as iron or steel, but also is not denatured or peeled at high temperatures in the presence of a reducing or oxidizing atmosphere.

SUMMARY OF THE INVENTION

The heat insulating coating material of the present invention is provided by preparing aggregates comprising silica-containing inorganic refractory fibers, silica-containing porous refractory materials and silica-containing powdery refractory materials, and adding to the aggregates an alkali metal silicate binder and water. This heat insulating material can be readily applied or adhered to surfaces of a metal such as iron or steel, and it is neither denatured nor peeled at high temperatures in the presence of a reducing or oxidizing atmosphere. The above-mentioned porous material may be replaced by a hollow material. Further, a phosphate binder may be used instead of the above-mentioned alkali metal silicate binder depending upon the nature of atmosphere. When a finely divided metal is mixed with the aggregates, the coating effect is further improved.

EXPLANATION OF EMBODIMENTS

Various and many researches and experiments have been made for the purpose of preventing the vitrification of a heat insulating coating material and, as a result, it has been found that a heat insulating coating material which can be readily applied to a substrate, which is not peeled even when heated at high temperatures in the presence of a reducing atmosphere and which is not entirely vitrified so that the insulation of said material is lowered, can be provided by preparing aggregates comprising silica ($SiO_2$)-containing inorganic refractory fibers, silica-containing particulate and porous refractory materials or hollow materials and silica-containing refractory powder and then adding to the aggregates a sodium silicate binder such as a mixture of sodium metasilicate ($Na_2O.SiO_2$) and sodium disilicate ($Na_2O.2SiO_2$).

Further, it has been found that a heat insulating coating material having a good insulation which can be readily applied to a substrate, which is not peeled even when heated at high temperatures in the presence of an oxidizing atmosphere and which is not changed in volume or nature thereof, can be provided by using a phosphate binder of a water soluble salt among compounds having general formula: $M_3PO_4$, $M_2HPO_4$ or $MH_2PO_4$ such as trisodium phosphate ($Na_3PO_4$), disodium hydrogen phosphate ($Na_2HPO_4$) or dipotassium hydrogen phosphate ($K_2HPO_4$), instead of the above-mentioned sodium silicate binder.

The novel composition of the heat insulating coating material will be detailedly referred to below.

Firstly, a heat insulating coating material used in the presence of a reducing atmosphere will be explained.

In general, inorganic refractory fibers do not only cause the physical strength of a heat insulating coating material to increase, but also they form voids in the material to improve the insulation. Hence, the silica ($SiO_2$)-containing inorganic refractory fibers used in this invention, for example, silica-alumina fibers form a sound coating because part of said silica in the fibers is bonded to a binder of sodium silicate. As a $Al_2O_3/SiO_2$ ratio in said refractory fibers is increased, the refractoriness is improved, but the bonding with the binder becomes weak. Therefore, a suitable $Al_2O_3/SiO_2$ ratio should be selected according to a temperature used. Refractory fibers having a $Al_2O_3/SiO_2$ ratio of one can withstand a high temperature of 1200° C.

Porous refractory materials, or hollow refractory materials having spherical vacancies formed therein produce voids in a heat insulating coating material, so that it is made light and remarkably improved in its insulation. Further, mixing porous refractory materials having a relatively low particle size (0.2 – 1.0 mm.) with inorganic refractory fibers prevents said fibers from being bonded to one another and improves the fluidity of the coating material.

When hollow $SiO_2$-containing refractory materials such as silica balloons, alumina balloons, silica-alumina balloons and volcanic ash sand balloons are used, part of the $SiO_2$ in these materials is bonded to a binder to form a sound coating and said hollow refractory materials may have different $Al_2O_3/SiO_2$ ratios which vary depending upon a temperature used, in the same manner as when refractory fibers are used.

Powdery refractory materials cover the metallic surface of a substrate and fill in spaces between refractory fibers and porous refractory materials, thus increasing the strength of the adhesion between the resultant coating and the substrate and the strength of said coating itself. Thus, silica powder, fused silica powder, zircon powder or silica-alumina clay may be used as a $SiO_2$-containing powdery refractory material, and part of the $SiO_2$ in the powdery refractory material is bonded to a binder to form a sound coating.

The alkali metal silicate binder may be sodium silicates having various $Na_2O/SiO_2$ ratios. For example, $2Na_2O.SiO_2$, $Na_2O.SiO_2$ and $Na_2O.2SiO_2$ may be raised, and these are gradually lowered in this order. The melting point of $Na_2O.SiO_2$ is 1080° C. The melting point of the eutectic ($Na_2O.2SiO_2 + SiO_2$) is 780° C. Therefore, a silicate having a suitable melting point should be selected from many alkali metal silicates.

However, since the aggregates of this heat insulating coating material contain $SiO_2$, they are partially reacted with the binder to form low melting compounds as a temperature increases. Therefore, a sodium silicate having a low $Na_2O/SiO_2$ ratio is selected as a binder. Generally, a binder used in this invention comprises predominantly sodium metasilicate ($Na_2O.SiO_2$), which may be mixed with sodium disilicate ($Na_2O.2SiO_2$) according to a temperature used. Sodium silicate becomes liquid as a temperature increases, and it is solidified in a vitreous state and adheres to a metallic surface as a temperature decreases. Therefore, there is no tendency of the resultant coating being peeled from the surface when heated or cooled.

$Na_2O$ contained in this heat insulating coating material is stable at a temperature of up to 1050° C. in a reducing atmosphere (including $H_2$ or CO). On the other hand, $SiO_2$ is stable at a temperature of up to 1260° C. in a reducing atmosphere. Further, a substance which is not reacted with an atmosphere, for example, oxides such as $ZrO_2$, MgO or $Al_2O_3$ or a finely divided metal such as Cr, Ti, Zr, Cu, Ag or Au may be added in a small amount to the aggregates of the heat insulating coating material to raise the coating effect or completely interrupt the metallic surface from the atmosphere.

Secondly, a heat insulating coating material used in the presence of an oxidizing atmosphere will be explained.

Inorganic refractory fibers and porous or hollow refractory materials behave in an oxidizing atmosphere in the same manner as mentioned above.

Powdery refractory materials used may be the same as mentioned above. In addition, titanium oxide ($TIO_2$) or zinc oxide (ZnO) may be used to achieve more sufficient prevention of the oxidization of a metallic surface of a substrate.

The phosphate binder causes aggregates to be firmly bonded to a surface of a metal such as iron or steel and reacts with the surface to produce a phosphate compound such as iron phosphate, so that the surface is prevented from being oxidized and a strong bonding is obtained between the surface and the coating.

As the phosphate binder there is used an alkali metal phosphate which has a viscosity when dissolved in water. Particularly, trisodium phosphate is suitable because it is stable at an elevated temperature (a melting point 1340° C.) and less hygroscopic at a normal temperature.

As mentioned above, $Al_2O_3$, $SiO_2$, and $Na_2O$ and $P_2O_5$ (from the phosphate) are stable under an oxidizing atmosphere and, hence, the heat insulating coating material of this invention is stable at a temperature of more than 1,000° C. (1,200° C. for a short period of time).

If a small amount of a finely divided metal such as Al, Cu, Ag, Au or Cr is incorporated into the aggregates in the heat insulating coating material, it is possible to raise the coating effect and completely interrupt the metallic surface from an oxidizing atmosphere.

Examples of this invention will be illustrated below.

EXAMPLE I

Heat insulating coating materials having various compositions as set forth in TABLE 1 and being used in a reducing atmosphere were prepared. These materials were coated in a thickness of 2 to 5 mm. over test pieces (made of S20C and SNC22) of 60 mm. in outer diameter and 10 mm. in thickness, and dried at 200° C. for 1 hours. Thereafter, the coated test pieces were placed in a reducing atmosphere ($H_2$ or CO) furnace at 950° C. for 48 hours. These test pieces at 879° C. were quenched in oil. The bond strength, mechanical strength, changes in conditions and thermal conductivity of the coating materials were determined. The results are reported in TABLE 2.

In TABLES 1 and 2, test pieces Nos. 1 to 14 are coated with the heat insulating coating materials of the present invention and test pieces Nos. 15 to 22 with prior heat insulating coating materials.

TABLE 1

| No. | FIBERS | | POROUS OR HOLLOW MATERIALS | | POWDERY REFRACTORY | | POWDERY METAL | | BINDER | | WATER IN GRAMS PER 100 GRS OF COMPOSITION |
|---|---|---|---|---|---|---|---|---|---|---|---|
| 1 | silica-alumina fibers | 5 | silica-alumina balloons | 5 | SiO2 | 80 | — | | $Na_2SiO_3$ | 10 | 150 |
| 2 | " | 7.5 | " | 7.5 | " | 75 | — | | " | 10 | 150 |
| 3 | " | 10 | " | 10 | " | 70 | — | | $Na_2SiO_3$ | 10 | 200 |
| 4 | " | 15 | " | 15 | " | 60 | — | | $Na_2SiO_3$ $Na_2O . 2SiO_2$ | 5 5 | 200 |
| 5 | " | 10 | " | 10 | " | 60 | Cr | 10 | NaSiO3 | 10 | " |
| 6 | " | 10 | " | 10 | " | 60 | Ti | 10 | " | 10 | " |
| 7 | " | 10 | " | 10 | " | 60 | Zr | 10 | " | 10 | " |
| 8 | " | 10 | " | 10 | SiO2 | 60 | Cu | 10 | NaSiO3 | 10 | 200 |
| 9 | " | 10 | " | 10 | " | 65 | Ag | 5 | " | 10 | " |
| 10 | " | 10 | " | 10 | " | 69 | Au | 1 | " | 10 | " |
| 11 | " | 10 | " | 10 | SiO2 ZrSiO4 | 35 35 | — | | " | 10 | " |
| 12 | " | 10 | " | 10 | SiO2 ZrO2 | 35 35 | — | | " | 10 | " |
| 13 | " | 15 | " | 10 | SiO2 MgO SiO2 | 35 35 35 | — | | " | 10 | 250 |

TABLE 1-continued

| No. | FIBERS | | POROUS OR HOLLOW MATERIALS | | POWDERY REFRACTORY | | POWDERY METAL | | BINDER | | WATER IN GRAMS PER 100 GRS OF COMPOSITION |
|---|---|---|---|---|---|---|---|---|---|---|---|
| 14 | " | 10 | " | 15 | " | 35 | — | | " | 10 | " |
| 15 | asbestos | 50 | — | | Al₂O₃ | 35 | — | | " | 25 | 100 |
| | | | | | SiO2 | 25 | | | | | |
| 16 | " | 50 | — | | TiO2 | 25 | — | | " | 25 | " |
| 17 | " | 35 | — | | SiO2 | 35 | — | | Na₂SiO3 | 6 | " |
| | | | | | TiO2 | 18 | | | | | |
| 18 | asbestos | 66.7 | — | | SiO2 | 33.3 | — | | Na₃PO4 colloidal alumina | 6 | — |
| 19 | " | 66.7 | — | | " | 33.3 | — | | colloidal silica | 250 | — |
| 20 | glass fibers | 60 | — | | " | 30 | — | | Na₂SiO3 | 10 | 100 |
| 21 | asbestos | 40 | diatomaceous earth | 10 | " | 25 | — | | " | 25 | " |
| 22 | — | | " | 25 | " | 50 | — | | " | 25 | " |

TABLE 2

| No. | BOND STRENGTH (kg/cm²) | STRENGTH OF HEAT INSULATING MATERIALS (kg/cm²) | CHANGE IN CONDITION WHEN HEATED | THERMAL CONDUCTIVITY (Kcal/mh° C) |
|---|---|---|---|---|
| 1 | 23.5 | 35 | unchanged | 0.172 |
| 2 | 20 | 30 | " | 0.145 |
| 3 | 14.5 | 22 | " | 0.105 |
| 4 | 11.6 | 18 | " | 0.097 |
| 5 | 15.0 | 23 | " | 0.121 |
| 6 | 16.5 | 24 | " | 0.115 |
| 7 | 12.0 | 19 | " | 0.111 |
| 8 | 13.0 | 20 | " | 0.125 |
| 9 | 18.0 | 25 | " | 0.118 |
| 10 | 16.5 | 24.5 | " | 0.107 |
| 11 | 15.5 | 23.5 | " | 0.100 |
| 12 | 16.0 | 24.0 | " | 0.102 |
| 13 | 11.0 | 17.5 | " | 0.115 |
| 14 | 13.0 | 20.5 | " | 0.110 |
| 15 | 1.0 | 3.0 | peeled (embrittled) | 0.139 |
| 16 | 1.0 | 2.0 | " | 0.130 |
| 17 | 1.0 | 2.5 | " | 0.132 |
| 18 | 1.0 | 3.0 | " | 0.130 |
| 19 | 1.0 | 4.2 | " | 0.129 |
| 20 | 20 | 32 | molten | 0.5 |
| 21 | 1.0 | 20 | " | 0.32 |
| 22 | 1.0 | 15 | " | 0.25 |

As reported in TABLE 2, it has been found that the major part of the prior coating materials have a very low bond strength of 1.0 kg/cm², and are peeled from the test pieces or molten to be in vitreous state when exposed to a reducing atmosphere at 950° C.

To the contrary, it has been found that the heat insulating coating materials of this invention all have a very high bond strength of 11 kgs/cm² or more, and are neither peeled, molten nor embrittled even when exposed to a reducing atmosphere at 950° C. Further, the thermal conductivity of the coating materials varies depending upon the proportions of fibers and porous (or hollow) materials added. The cooling rate of the test pieces having the coating material containing 7.5% fibers and 7.5% porous materials applied thereon when quenched, is ¼ or less, as compared with those of the test pieces having no coating material applied thereon. Thus, the heat insulating effects of the coating material of the present invention has been found to be very excellent.

EXAMPLE II 150 parts of water was added to 100 parts of a mixture comprising 7.5 parts of silica powder, 7.5 parts of silica-alumina fibers, 7.5 parts of silica-alumina balloons (porous material) and 10 parts of sodium metasilicate. The resultant mixture was sprayed onto the interior of a reducing atmosphere furnace. The lining thus obtained was light and had a good adhesiveness. It had a high bond strength after dried and, therefore, could be fixed to the steel wall of the furnace without studs provided on the steel wall. Further, it was not peeled from said wall even when repeatedly heated to 1000° C., and it had satisfactory heat insulating effects.

EXAMPLE III

Heat insulating coating materials having various compositions as set forth in TABLE 3 and being used in an oxidizing atmosphere were prepared. These materials were coated in a thickness of 2 to 5 mm. over test pieces (made of S20C) of 60 mm. in outer diameter and 10 mm. in thickness, and dried at 200° C. for 1 hour. Thereafter, the coated test pieces were placed in an oxidizing atmosphere furnace at 1000° C. for 5 hours and cooled to room temperature. These test pieces at 870° C were quenched in oil. The bond strength, mechanical strength, changes in properties and thermal conductivity of the coating materials were determined. The results are reported in TABLE 4.

In TABLES 3 and 4, test pieces Nos. 1 to 14 are coated with the heat insulating coating materials of the present invention and test pieces Nos. 15 to 22 with prior heat insulating coating materials.

TABLE 3

| No. | FIBERS | | POROUS OR HOLLOW MATERIALS | | POWDERY REFRACTORY | | POWDERY METAL | | BINDER | | WATER IN GRAMS PER 100 GRS OF COMPOSITION |
|---|---|---|---|---|---|---|---|---|---|---|---|
| 1 | silica-alumina fibers | 5 | silica-alumina balloons | 5 | SiO2 | 80 | — | | Na₃PO4 | 10 | 150 |
| 2 | " | 7.5 | " | 7.5 | " | 75 | — | | " | 10 | 150 |
| 3 | " | 10 | " | 10 | " | 70 | — | | " | 10 | 200 |
| 4 | " | 15 | " | 15 | " | 60 | — | | " | 10 | 200 |
| 5 | " | 10 | " | 10 | " | 60 | Al | 10 | " | 10 | " |
| 6 | " | 10 | " | 10 | " | 60 | Cr | 10 | " | 10 | " |
| 7 | " | 10 | " | 10 | " | 60 | Ti | 10 | " | 10 | " |
| 8 | silica-alumina fibers | 10 | silica-alumina balloons | 10 | SiO2 | 60 | Zr | 10 | Na₃PO4 | 10 | 200 |

TABLE 3-continued

| No. | FIBERS | POROUS OR HOLLOW MATERIALS | POWDERY REFRACTORY | | POWDERY METAL | | BINDER | | WATER IN GRAMS PER 100 GRS OF COMPOSITION |
|---|---|---|---|---|---|---|---|---|---|
| 9 | " | 10 | " | 10 | " | 60 | Cu | 10 | " | " | 10 | " |
| 10 | " | 10 | " | 10 | " | 60 | Ag | 5 | " | 10 | " |
|   |   |   |   |   | Au | 1 |   |   |   |
| 11 | " | 15 | " | 10 | SiO2 ZnO2 | 30 30 | — | | " | 10 | " |
| 12 | " | 10 | " | 10 | SiO2 TiO2 | 30 30 | — | | — | 10 | " |
| 13 | " | 10 | " | 15 | SiO2 ZrO2 | 30 30 | — | | " | 10 | 250 |
| 14 | " | 15 | " | 10 | SiO2 Al2O3 | 30 30 | — | | " | 10 | " |
| 15 | asbestos | 35 | — | | SiO2 TiO2 | 35 18 | — | | Na2SiO3 | 10 | 100 |
| 16 | " | 50 | — | S | SiO2 | 25 | — | | " | 10 | " |
| 17 | " | 50 | — | | TiO2 | 25 | — | | " | 10 | " |
| 18 | asbestos | 66.7 | — | | SiO2 | 33.3 | — | | colloidal alumina | 250 | — |
| 19 | " | 66.7 | — | | " | 33.3 | — | | colloidal silica | 250 | — |
| 20 | glass fibers | 60 | — | | " | 30 | — | | Na2SiO3 | 10 | 100 |
| 21 | asbestos | 40 | diatomaceous earth | 10 | " | 25 | — | | Na3PO4 | 25 | " |
| 22 | — | | " | 25 | " | 50 | — | | " | 25 | " |

TABLE 4

| No. | BOND STRENGTH (kg/cm²) | STRENGTH OF HEAT INSULATING MATERIALS (kg/cm²) | CHANGE IN CONDITION WHEN HEATED | THERMAL CONDUCTIVITY (Kcal/mh° C) |
|---|---|---|---|---|
| 1 | 24.0 | 40 | unchanged | 0.173 |
| 2 | 21 | 33 | " | 0.146 |
| 3 | 15.0 | 24 | " | 0.107 |
| 4 | 12.0 | 20 | " | 0.097 |
| 5 | 14.5 | 25 | " | 0.120 |
| 6 | 16.0 | 23 | " | 0.123 |
| 7 | 11.0 | 17 | " | 0.119 |
| 8 | 12.8 | 21 | " | 0.120 |
| 9 | 18.5 | 24 | " | 0.130 |
| 10 | 17.3 | 26.5 | " | 0.132 |
| 11 | 15.0 | 24.5 | " | 0.100 |
| 12 | 14.0 | 25.0 | " | 0.107 |
| 13 | 12.0 | 17.5 | " | 0.116 |
| 14 | 12.5 | 20.5 | " | 0.125 |
| 15 | 1.0 | 5.0 | peeled (embrittled) | 0.137 |
| 16 | 1.0 | 2.8 | " | 0.131 |
| 17 | 1.0 | 3.7 | " | 0.130 |
| 18 | 1.0 | 3.2 | " | 0.135 |
| 19 | 1.0 | 4.7 | " | 0.137 |
| 20 | 20 | 30 | molten | 0.46 |
| 21 | 1.0 | 22.5 | " | 0.30 |
| 22 | 1.0 | 17 | " | 0.26 |

As reported in TABLE 4, it has been found that the major part of the prior coating materials have a very low bond strength of 1.0 kg/cm², and are peeled from the test pieces or molten to be in a vitreous state when exposed to an oxidizing atmosphere at 1000° C.

To the contrary, it has been found that the heat insulating materials of this invention all have a very high bond strength of 11 kgs/cm² and are neither peeled, molten nor embrittled even when exposed to an oxidizing atmosphere at 1000° C. Further, the thermal conductivity of the coating materials varies depending upon the proportions of fibers and porous (hollow) materials added. The cooling rate of the coating material containing 7.5% fibers and 7.5% porous materials when quenched, is ¼ or less, as compared with those of the test pieces having no coating material applied thereon. Thus, the heat insulating effects of the coating material of the present invention has been found to be very excellent.

EXAMPLE IV 250 parts of water was added to 100 parts of a mixture comprising 65 parts of silica powder, 10 parts of silica-alumina fibers, 10 parts of silica-alumina balloons (porous material), 5 parts of titanium oxide and 10 parts of sodium triphosphate. The resultant mixture was sprayed onto the interior of an oxidizing atmosphere furnace. The lining thus obtained was light and had a good adhesiveness. It had a high bond strength after dried and, therefore, could be fixed to the steel wall of the furnace without studs provided on the wall. Further, it was not peeled from said wall even when repeatedly heated to 1000° C., and it had satisfactory heat insulating effects.

As explained above, the heat insulating coating material of this invention can be readily adhered to metallic surfaces, have a high strength and a high heat insulation when dried for a short period of time and be durable at a temperature of up to 1000° C. (even 1200° C. for a short period of time) in an oxidizing atmosphere. Thus, the heat insulating coating material of this invention can be more readily applied than prior heat insulating materials. Therefore, applying time can be shortened. Further, the heat insulating coating material of this invention has a high thermal or mechanical strength and, hence, the life thereof is longer.

Since the heat insulating coating material of this invention is light and has a high adhesiveness, it is allowed to be adhered to any places. Further, it is stable in an oxidizing atmosphere to which prior insulating materials are not resistant. Particularly, the heat insulating coating material of this invention has such advantages that the use of said material as the lining of a furnace makes it possible to reduce the weight of the furnace and diminish or omit supporters for the lining.

What is claimed is:

1. A composition for forming a heat insulating coating comprising (a) 5% to 15% of silcia-alumina fibers, (b)

5% to 15% of a hollow refractory selected from the group consisting of silica balloons, alumina balloons, silica-alumina balloons and volcanic ash sand balloons, (c) 30% to 80% of a powdery refractory comprising a material selected from the group consisting of silica powder, fused silica, zircon powder and silic-alumina clay, (d) a binder comprising 5% to 10% of sodium metasilicate and (e) water in an amount of 1.5 to 2.5 times the amount of components (a), (b), (c) and (d) on a weight basis.

2. The compositions of claim 1, wherein said composition further contains 1 to 10% of a fine metal powder selected from the group consisting of Cr, Ti, Zr, Cu, Ag and Au.

3. The composition of claim 1, wherein at least about half of said powdery refractory on a weight basis is silica powder, fused silica, zircon powder or silica-alumina clay.

4. The composition of claim 3, wherein said powdery refractory contains $ZrO_2$, MgO or $Al_2O_3$.

5. A composition for forming a heat insulating coating comprising (a) silica-alumina fibers, (b) a hollow refractory selected from the group consisting of silica balloons, alumina balloons, silica-alumina balloons and valeanic ash sand balloons, (c) a powdery refractory comprising a material selected from the group consisting of silica powder, fused silica, zircon powder and silica-alumina clay, (d) a binder comprising trisodium phosphate and (e) water.

6. The composition of claim 5, wherein said composition comprises 5 to 15% silica-alumina fibers, 5 to 15% porous refractory, 30 to 80% powdery refractory and 5 to 10% binder, the percents being based on the weight of components (a), (b), (c) and (d), the amount of water in said composition being 1.5 to 2.5 times the amount of components (a), (b), (c) and (d) on a weight basis.

7. The composition of claim 6, wherein at least about half of said powdery refractory on a weight basis is silica powder, fused silica, zircon powder or silica-alumina clay.

8. The composition of claim 7, wherein said powdery refractory contains $TiO_2$, $ZrO_2$ or $Al_2O_3$.

9. The composition of claim 6, wherein said composition further contains about 1 to 10% fine metal powder selected from the group consisting Cr, Ti, Zr, Cu, Ag and Au.

10. A process for forming a heat insulating coating on a metal substrate comprising applying the composition of claim 5 to said substrate and allowing said composition to dry.

11. A process for forming a heat insulating coating on a metal substrate comprising applying the composition of claim 1 to said substrate and allowing said composition to dry.

12. In an apparatus having a metal surface and a heat-protective coating on said metal surface formed from an inorganic material, the improvement wherein said heat-protective coating is formed by applying the composition of claim 1 to said metal surface and allowing said composition to dry.

13. In an apparatus having a metal surface and a heat-protective coating on said metal surface formed from an inorganic material, the improvement wherein said heat-protective coating is formed by applying the composition of claim 5 to said metal surface and allowing said composition to dry.

14. The composition of claim 2, wherein said fine metal powder is Cr.

15. The composition of claim 9, wherein said fine metal powder is Cr.

16. The composition for forming a heat insulating coating comprising (a) 5% to 15% of silica-alumina fibers, (b) 5% to 15% of a porous refractory having a particle size in the range of 0.2–1.0 mm, (c) 30% to 80% of a powdery refractory comprising a material selected from the group consisting of silica powder, fused silica, zircon powder and silica-alumina clay, (d) a binder comprising 5% to 10% of sodium metasilicate or trisodium phosphate and (e) water in an amount of 1.5 to 2.5 times the amount of components (a), (b), (c) and (d) on a weight basis.

* * * * *